July 4, 1944. J. NOVAK 2,353,114

CABLE CONNECTOR FOR WELDING MACHINES

Filed July 23, 1943

INVENTOR.
John Novak
BY Henry J. E. Metzler
Agt.

Patented July 4, 1944

2,353,114

UNITED STATES PATENT OFFICE 2,353,114

CABLE CONNECTOR FOR WELDING MACHINES

John Novak, Brownsville, Pa.

Application July 23, 1943, Serial No. 495,863

1 Claim. (Cl. 173—328)

My invention relates to improvements in cable connectors, and more specifically to devices for connecting cables for welding machines to one pole of a source of current.

Since large quantities of current are required for electric welding, the ordinary terminals, plug-in contact plugs, and the like are usually unsatisfactory for connecting the cable of a welding machine or welding station to a source of current. Even if plug-in contact plugs are theoretically of adequate dimensions, it happens frequently that the male contact part is not inserted tightly into the female contact part, and a burning of the contact parts or fusing together will result. Also, if the cables are provided with cable shoes and are connected to a source of current by means of studs and wing nuts, the connection can usually not be made sufficiently tight without manipulating the wing nuts by means of pliers, wrenches or other tools, which are not always at hand. The repairing of burned contacts and the removal of cables from contacts to which they were fused due to insufficiently tight connections causes high expenses and requires much time.

It is, therefore, the main object of the present invention to provide a welding cable connector which makes a sufficiently tight connection between cable and source of current possible without requiring the use of any tools and without requiring the cables to be provided with cable shoes.

Another object of the present invention is to provide a simple and accurate device for the purpose stated above, which is light in weight and simple in construction to be manufactured and sold at a very reasonable price.

Further objects of the instant invention reside in any novel feature of construction or operation or novel combination of parts present in the embodiment of the invention described and shown in the accompanying drawing, whether within or without the scope of the appended claim and irrespective of other specific statements as to the scope of the invention contained herein.

In the drawing.

Similar numerals refer to similar parts throughout the several views.

Figures 1, 2:
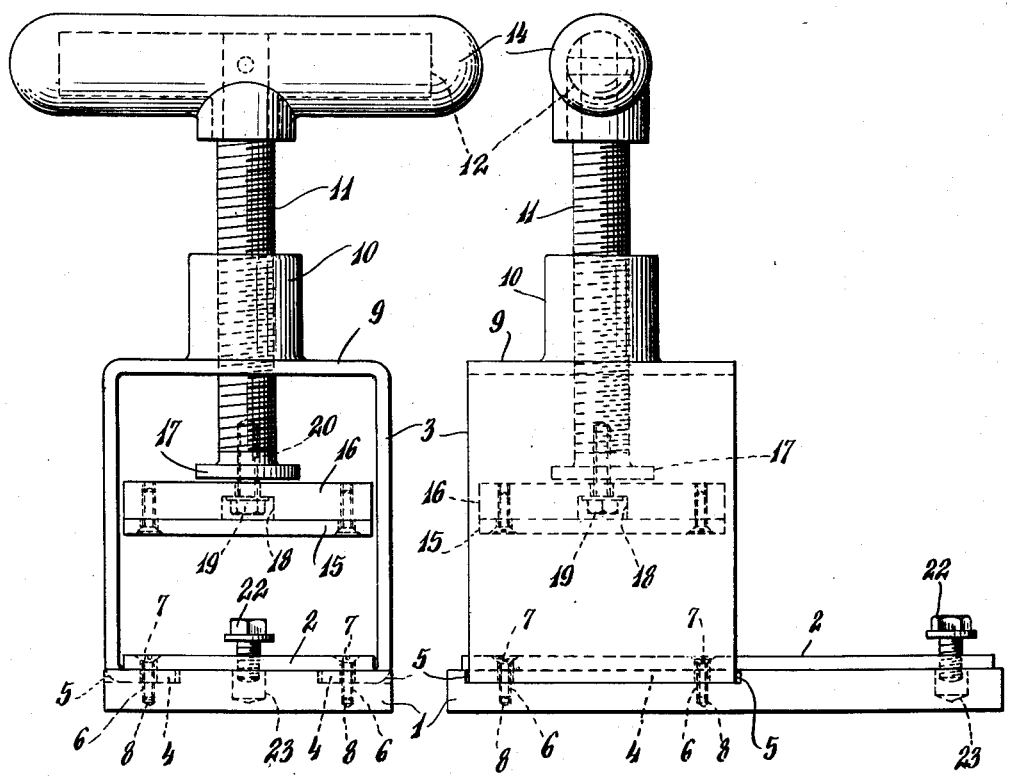
Figure 1 is a front elevation of a preferred embodiment of the invention.
Figure 2 is a side elevation.

The base of my improved cable connector is a plate 1 of insulating material upon which a conductor plate 2 of copper or the like is mounted. I prefer to make the insulating base plate 1 slightly longer and broader than plate 2 so that plate 1 protrudes over plate 2 on all four sides, as may be seen in the drawing. A flat piece of material, preferably a piece of steel, is bent rectangularly so as to form an open case 3, the horizontal lower portion 4 of which is interrupted as shown in Fig. 1. The case 3 can be secured to the plates 1 and/or 2 in any suitable manner, preferably in that shown in the drawing where it will be seen that the plate 1 is provided with recesses 5, adapted to receive the horizontal portions 4, and that screws 6, which have counter-sunk heads 7, extend through the plate 2 and the vertical portions 4 and are screwed into threaded holes 8 which extend partially through plate 1.

Th upper portion 9 of the case 3 is provided with a collar 10 secured thereto by welding or the like, and a threaded aperture is extended through collar 10 and portion 9. A threaded bolt 11 is screwed into collar 10 and portion 9, and is provided at its upper end with an insulating handle 12, which is preferably T-shaped. The insulation 14 can be secured to the handle 12 in any suitable manner, preferably by pressing it around the entire handle 12 and partially around the upper part of bolt 11. A pressure plate, preferably consisting of a copper plate 15, to which a plate 16 of steel or the like is secured, is pivotally secured to the lower end of bolt 11. I prefer to make the lower portion 17 of bolt 11 wider than the threaded shaft portion and to provide a recess 18 in the center of plate 16 to receive the head 19 of a screw 20, which is screwed into bolt 11, so that the bolt 11 can be turned relative to plate 16. Thus, the blank end of a welding machine cable, not shown, can be laid in the case 3 upon the plate 2 and can be tightened thereupon by manipulating the insulated handle 12 so that the plate 15 presses upon the cable. The plate 2 can be connected to one pole of a source of current by means of a contact screw 22, which is screwed in plate 2 and the shaft of which extends into an aperture 23 which is partially extended through the insulating base plate 1.

This cable connector can be placed at various outlets of an electric wiring system in a workshop, shipyard, or at places where welding machines or portable welding stations are occasionally used, and it can be permanently connected to the wiring system. The welder has then only to fasten the blank end of the welding machine cable at the next cable connector, which can be done without any tools within a very short period of time.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

Having thus described my invention, what I claim and desire to secure by Letters Patent in the United States is:

A cable connector for welding machines comprising an insulating base plate; a conductor plate which is slightly shorter and narrower than said base plate and which is placed upon said base plate in such a manner that the edges of said base plate protrude at all four sides over said conductor plate; a flat piece of material bent rectangularly so as to form an open case, the horizontal lower portion of which is interrupted and engages recesses in said base plate below said contact plate and the upper portion of which is provided with a centrally located internally threaded collar; a threaded bolt extending through said collar and having an insulating, T-shaped handle at its upper end and a pressure plate secured to its lower end in such a manner that said bolt can be rotated relative to said pressure plate; screws extending through said contact plate, through the horizontal lower portions of said open case, and partially through said base plate, said screws connecting said contact plate and said open case to said base plate, and a contact screw being screwed into a threaded aperture of said contact plate and extending partially into said base plate.

JOHN NOVAK.